United States Patent Office 3,503,212
Patented Mar. 31, 1970

3,503,212
CATALYTIC HYDRAZINE DECOMPOSITION PROCESS USING CHROMIUM CONTAINING CATALYST
Thomas J. Jennings, Lafayette, and Hervey H. Voge, Berkeley, Calif., assignors to Shell Oil Company, New York, N.Y., a corporation of Delaware
No Drawing. Filed Apr. 9, 1968, Ser. No. 719,856
Int. Cl. C06d 5/04; C06c 1/02; F23r 1/14
U.S. Cl. 60—219       6 Claims

ABSTRACT OF THE DISCLOSURE

An improved hydrazine decomposition process employs, as catalyst, mixed oxides of copper and chromium and optionally additionally nickel on an inert, porous support.

BACKGROUND OF THE INVENTION

It is known that hydrazine is thermally or catalytically decomposed to an initial mixture of hydrogen, nitrogen and ammonia and that the ammonia component of this mixture may be further dissociated into additional hydrogen and nitrogen in the presence of the proper catalysts at the elevated temperatures produced by the initial decomposition which is highly exothermic. Both reactions result in the production of large volumes of gases from a relatively small volume of hydrazine reactant. This leads to the use of hydrazine and hydrazine-containing mixtures as fuel or mono-propellant in jet propulsion devices, such as rockets, and gas generators to operate turbines and the like.

Under normal operation, the hydrazine decomposition catalysts are subjected to severe thermal and physical stresses due to the high temperature and constant agitation encountered during hydrazine decomposition. It is therefore necessary that the catalyst exhibit physical strength as well as continuous catalytic activity, particularly when the catalyst is employed to initiate a series of intermittent decompositions.

Many conventional types of catalysts are not satisfactory in this type of operation and most catalysts that are useful suffer from the disadvantages of being expensive and/or difficult to obtain, or of not being capable of initiating hydrazine decomposition at a sufficiently rapid rate. By way of illustration, the British Patent 930,499 of Englehard Industries, published July 3, 1963, discloses a variety of catalysts comprising members of the platinum group of metals, e.g., rhodium, iridium, ruthenium and the like, employed in conjunction with an alumina support. It would be of advantage, however, to provide an active catalyst for hydrazine decomposition whose components are relatively inexpensive and readily available.

SUMMARY OF THE INVENTION

It has now been found that an improved catalytic hydrazine decomposition process is characterized by a catalyst composition comprising a copper chromite-type catalyst, optionally additionally containing nickel, employed in conjunction with a porous catalyst support, which composition serves to efficiently and rapidly decompose liquid hydrazine and hydrazine-containing fuels. Although the precise chemical character of the catalyst is not known with certainty, its composition is conveniently expressed as a mixture of oxides of chromium, copper and optionally additionally nickel.

DESCRIPTION OF THE PREFERRED EMBODIMENTS

The catalyst of the invention consists essentially of oxygen in chemical combination with chromium, i.e., chromium (III), copper and optionally nickel. It is considered likely that the catalysts contain one or more single discrete compounds such as copper chromite ($CuO \cdot Cr_2O_3$) and nickel chromite ($NiO \cdot Cr_2O_3$), and the catalysts normally contain an excess of copper oxide or nickel oxide, probably in solid solution in the chromite. For simplicity, however, the catalysts are described as a mixture of oxides of a character similar to that mixture which is conventionally termed "copper chromite."

The proportion of chromium to the total other metal material in the mixed oxide catalyst, i.e., copper and optionally additionally nickel, suitably a gram-atom ratio of from about 1:3 to about 3:1 although gram-atom ratios from about 1:1.5 to about 1.5:1 are preferred. The other metal material present in the chromium oxide catalyst comprises copper or copper and nickel. In the preferred modifications where the metal oxide catalyst contains copper and nickel, the nickel is suitably present in a gram-atom amount of up to 90%, preferably from about 60% to 85% of the total metal material other than chromium.

The mixed metal oxide catalyst is employed in conjunction with an inert, porous support of non-reducible material. Although non-reducible materials such as carbides, nitrides, morides and silicides are suitably employed as the catalyst support, preferred supports are oxides, preferably refractory oxides such as alumina, zirconia, magnesia, beryllia, silica, titania, thoria, ythria and hafnia. Synthetic porous refractories such as are sold under the trade names Carborundum, Alundum, and Filtros are useful as are naturally occurring porous materials such as pumice and diatomite. Preferred catalyst supports contain a major proportion of alumina, e.g., at least 85% by weight alumina, preferably at least 95% by weight, with any remainder being inert support material.

The amount of mixed oxide catalyst on the support is not critical so long as sufficient catalyst material is present to permit adequate hydrazine-catalyst contacting to allow the decomposition of the hydrazine to proceed at an acceptable rate. The mixed oxide catalyst is typically present in an amount from about 5% by weight to about 40% by weight based on total catalyst composition with an amount from about 20% by weight to about 35% by weight on the same basis being preferred.

The production of the supported catalysts is effected by conventional techniques of dry-mixing, coprecipitation, impregnation and the like and the catalyst composition components are introduced in one operation or are introduced separately in stages. In the latter modifications, the order in which the various components are introduced is not critical although it is generally preferred to introduce the copper and any nickel subsequent to the addition to the support of the chromium. The catalyst components are placed so as to at least partly fill the small pores and crevices of the support. The support is in the form of porous particles, e.g., spheres, pellets or granules, or is in the form of a matrix such as a honeycomb, a sponge-like solid block, a woven fiber of inorganic material or a screen or mesh coated with the oxide film. The catalyst components extend through the support or are limited to a relatively thin surface region.

It practice, the catalyst composition is subjected to treatment at elevated temperature in the presence of an oxygen-containing gas prior to use as the hydrazine decomposition catalyst. One function of such treatment is to convert any catalyst components into the form of the oxides if the components were not initially present as oxides. Thus, the catalyst components are suitably provided as nitrates, acetates, hydroxides, chromates or the like and are converted to oxides by being maintained at elevated temperature, e.g., from about 200° C. to about 400° C., in the presence of air or other oxygen-containing gas for a period of time which typically varies from about 0.5 hour to about 3 hours.

The catalyst composition is maintained in a conventional reactor suitable for utilization of the energy obtainable from hydrazine decomposition. The hydrazine is introduced to the catalyst as a liquid at relatively low temperatures, e.g., temperatures as low as about 1° C. in the case of relatively pure hydrazine and even lower in the case of mixtures of hydrazine and other similar fuel components. The catalyst is capable of initiating decomposition of the low-temperature hydrazine at least once without catalyst preheating and is capable of initiating repeated intermittent decompositions provided that the catalyst does not become overly cool between the decompositions.

In order to more fully illustrate the improved hydrazine decomposition process of the invention, the following examples are provided. It should be understood that the details thereof are not to be regarded as limitations as they may be varied as will be understood by one skilled in this art.

Example I

A supported catalyst was prepared by contacting 120 ml. of an aqueous solution of 35.2 g. of ammonium dichromate, 26.4 ml. of 2% ammonium hydroxide solution and 100 g. of an alumina support and allowing the mixture to stand for 10 minutes. To the mixture was added, with stirring, 60 ml. of an aqueous solution containing 6.5 g. of cupric nitrate trihydrate and the resulting slurry was dried under a hot-air gun while being stirred. When free-flowing, the granules were maintained for one hour in a muffle furnace at 350° C. The resulting catalyst composition contained about 24% by weight of catalyst based on total composition.

Example II (A) Individual granules of the catalyst composition of Example I were tested by adding hydrazine to the catalyst composition dropwise. Violent reaction took place when the hydrazine contacted the catalyst.

(B) Evaluation of the copper oxide-chromium oxide catalyst was carried out in a thrust reactor of approximately 44 ml. capacity. The reactor was tubular in character, of approximately 1.04 in. inside diameter and 3.5 in. length with a fuel spray nozzle inlet at one end and a throat exhaust opening of 0.164 in. inside diameter at the other end.

The 9 ml. of volume nearest the fuel inlet was packed with a catalyst composition prepared according to Example I with 25% copper oxide-chromium oxide catalyst on 14–18 mesh alumina. The remainder of the reactor was filled with 32 ml. of a similar catalyst composition in which the support was in the form of 3/16 in. spheres, and finally 3 ml. of inert alumina granules.

With the reactor temperature at 5° C., hydrazine at 5° C. was introduced to obtain a smooth and essentially immediate initiation of decomposition. The bed temperature rose rapidly to 800° C. and the reactor ran steadily with an average fuel feed of 9 ml./sec.

The hydrazine fuel feed was stopped and the catalyst bed allowed to cool. When the bed temperature reached 200° C., flow of hydrazine fuel at 5° C. was begin. The ignition delay time, i.e., the time lapse until the first observed downstream pressure rise, was 20 milliseconds (msec.).

Upon repeating this procedure, restarts with bed temperatures of 140° C. and 100° C. were obtained with ignition delays of 180 and 555 msec., respectively.

Example III

A catalyst composition containing approximately 15% by weight based on total composition and having a 4:1:6 atom ratio of nickel to copper to chromium was produced by adding 60 ml. of an aqueous solution containing 17.6 g. of ammonium dichromate and 13.2 ml. of 28% ammonium hydroxide solution to 100 g. of an alumina support. After the mixture had stood for 10 minutes, 50 ml. of an aqueous solution containing 28 g. of nickel nitrate hexahydrate and 5.9 g. of copper nitrate trihydrate were added with stirring and the resulting mixture was dried under a hot-air gun while being stirred. When free flowing, the granules of catalyst composition were heated for one hour in a muffle furnace at 350° C.

Example IV

A catalyst composition produced according to Example III employing 20–30 mesh alumina was tested for the decomposition of hydrazine in a small laboratory-scale thrust reactor. The reactor chamber held 2.7 g. of the catalyst composition and at a hydrazine flow rate of 0.5 ml./sec. developed about 40 p.s.i.g. upon decomposition in contact with the catalyst composition.

Example V

Catalyst compositions similar to those described in Example II–B were prepared except that the catalyst contained nickel, copper chromium in an atom ratio of 4:1:6. The compositions were employed in the thrust reactor in the manner described in Example II–B to initiate hydrazine decomposition. With the reactor starting temperature and the hydrazine fuel at 5° C., a smooth and essentially instantaneous initiation of decomposition was observed at an average hydrazine fuel feed rate of 9 ml./sec.

As is described in Example II–B, the fuel flow was stopped and restarted when the catalyst bed had cooled to 200° C. With the fuel at 5° C., the ignition delay was less than 15 msec. On repeating the procedure, restarts at catalyst bed temperatures of 150° C. and at 100° C. were obtained with ignition delays of 15 msec. and 145 msec. respectively. The shorter ignition delays, compared with the data of Example II, emphasize the advantage of incorporating nickel within the catalyst composition.

Example VI

When a catalyst composition containing 25% by weight of mixed metal oxides of nickel, copper and chromium in a 4:1:6 atomic ratio was employed with mixed hydrazine fuels which are liquid at such temperatures, such as the 50%:45%:5% mixture of hydrazine, hydrazine nitrate and water disclosed by Audrieth et al., U.S. 2,943,927, initiation of hydrazine decomposition was effected at temperatures as low as −40° C. and −50° C.

We claim as our invention:

1. In a reaction process of catalytically decomposing liquid hydrazine-containing fuels to produce thrust by contacting said fuel with a hydrazine decomposition catalyst, the improvement which comprises employing as the hydrazine decomposition catalyst a catalyst composition consisting essentially of
   (a) a catalyst support of inert, porous, non-reducible material, and
   (b) from about 5% by weight to about 40% by weight based on total catalyst composition of mixed metal oxides wherein the gram-atom ratio of chromium to total other metal material is from about 1:3 to about 3:1, said other metal material being copper or copper and nickel wherein the nickel is present in a gram-atom amount up to 90% of said total other metal material.

2. The process of claim 1 wherein the catalyst support material is a refractory oxide.

3. The process of claim 2 wherein the refractory oxide is at least 85% by weight alumina.

4. The process of claim 3 wherein said other metal material of said metal oxides is copper.

5. The process of claim 3 wherein said other metal material of said mixed metal oxides is copper and nickel.

6. The process of claim 5 wherein the gram-atom amount of the nickel in the other metal material is from about 60% to about 85% of the total other metal material.

References Cited

UNITED STATES PATENTS

| | | | |
|---|---|---|---|
| 2,925,709 | 2/1960 | Mantell et al. | 149—36 X |
| 2,926,144 | 2/1960 | Plescia et al. | 252—474 |
| 2,930,184 | 3/1960 | Plescia et al. | 60—218 X |
| 3,086,945 | 4/1963 | Cohn | 149—36 X |
| 3,165,382 | 1/1965 | Forte | 60—218 X |

BENJAMIN R. PADGETT, Primary Examiner

U.S. Cl. X.R.

60—218; 149—36